No. 747,675. PATENTED DEC. 22, 1903.
T. G. BENNETT.
EXTRACTOR FOR FIREARMS.
APPLICATION FILED OCT. 9, 1903.
NO MODEL.
Fig. 1
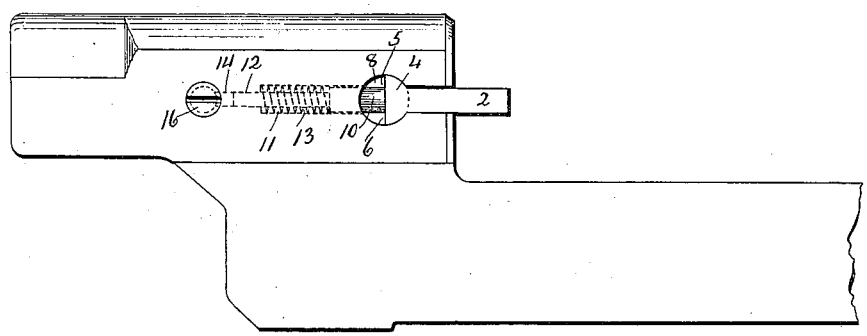
Fig. 2
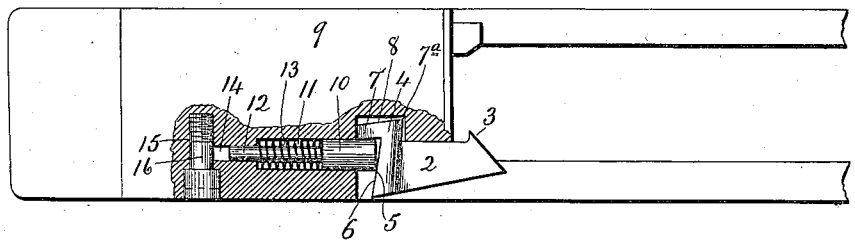
Fig. 3
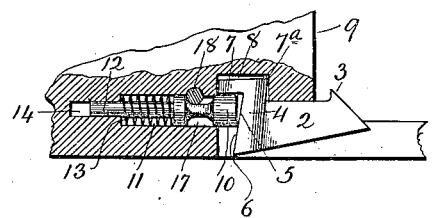
Fig. 4    Fig. 5
 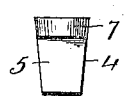

No. 747,675.

Patented December 22, 1903.

UNITED STATES PATENT OFFICE.

THOMAS G. BENNETT, OF NEW HAVEN, CONNECTICUT, ASSIGNOR TO WINCHESTER REPEATING ARMS CO., OF NEW HAVEN, CONNECTICUT, A CORPORATION.

EXTRACTOR FOR FIREARMS.

SPECIFICATION forming part of Letters Patent No. 747,675, dated December 22, 1903.

Application filed October 9, 1903. Serial No. 176,402. (No model.)

*To all whom it may concern:*

Be it known that I, THOMAS G. BENNETT, of New Haven, in the county of New Haven and State of Connecticut, have invented a new and useful Improvement in Extractors for Firearms; and I do hereby declare the following, when taken in connection with the accompanying drawings and the figures of reference marked thereon, to be a full, clear, and exact description of the same, and which said drawings constitute part of this specification, and represent, in—

Figure 1, an enlarged broken view in side elevation of an extractor constructed in accordance with my invention and applied to a breech-block of the type having a forward balancing extension, such as shown in Patent No. 681,481, granted to Thomas C. Johnson under date of the 27th of August, 1901; Fig. 2, an enlarged broken plan view of the breech-block, the body of the block being broken away to also show the extractor in plan; Fig. 3, a broken view showing one of the modified forms which my improved extractor may assume; Fig. 4, a detached view, in inside elevation, of the extractor; Fig. 5, a view thereof in rear elevation.

My invention relates to an improvement in extractors for firearms, the object being to prevent the extractor from being displaced or disarranged in firing the gun in case there is an escape of gas under high pressure at the time of firing, owing to the bursting of the head of a cartridge.

With these ends in view my invention consists in the combination, with the breech-block of a firearm, of a swinging non-pivotal extractor, a spring-actuated plunger therefor, and a plunger-stop for limiting the movement of the plunger after the extractor is in place, so as to prevent its disengagement from the extractor under gas-pressure.

My invention further consists in certain details of construction and combinations of parts, as will be hereinafter described, and pointed out in the claims.

While my improved extractor is applicable to different kinds of breech-blocks, I have chosen to show its application to a breech-block having a forward balancing extension—such, for instance, as shown and described in Patent No. 681,481, granted to Thomas C. Johnson under date of the 27th of August, 1901.

As herein shown, the extractor consists of a shank 2, furnished at its forward end with an extracting-nose 3 and having its rear end formed with a transversely-arranged tapering foot 4, the rear face of which is provided with a deep notch 5, forming an inclined operating-face 6, and a retaining-hook 7. The larger inner end of the said foot 4 is beveled to produce a nose 7ª, upon which the extractor turns as upon a fulcrum, for the extractor is, in effect, a swinging non-pivotal extractor, as differentiated from those extractors which turn upon pivots or pins passing through them and positively retaining them in place. The said extractor is located in a deep recess or extractor-chamber 8, extending horizontally inward from the right-hand wall of the breech-block 9, and swings laterally in the said recess 8, turning on its nose 7ª, as stated. The deep notch 5, formed in the rear face of the foot 4, receives a plunger 10, located in a plunger recess or socket 11, formed in the breech-block 9 at a point directly to the rear of the extractor-chamber 8. This plunger is provided with a stem 12, encircled by a plunger-spring 13, located in the bottom of the socket 11. A small hole 14, leading out of the bottom of the socket 11, receives the extreme rear end of the stem 12 and opens into a transversely-arranged screw-hole 15, receiving a plunger-stop in the form of a screw 16. The extractor is normally retained in place by its retaining-hook 5 in coaction with the forward end of the plunger, which yields as the extractor swings.

In order to permit the extractor to be inserted into the extractor-chamber 8, the plunger must be adapted to be retired or moved rearwardly to a sufficient extent to clear the foot of the extractor, the proper operation of which does not, however, require anything like so much play on the part of the plunger, the longer movement of which is required merely for the purpose of assembling the parts. Now in order that the extractor may not be blown out of the gun or displaced in case the head of a cartridge should burst and allow gas under high pressure to escape rearwardly I provide the plunger-stop, which in this embodiment of my invention has the form of a screw 16. This plunger-stop is inserted after the assembling of the other parts, and when in place is engaged by the rear end of the stem 12 of the plunger and prevents the plunger from being moved rearwardly to a sufficient extent to be disengaged from the retaining-hook 7 of the extractor.

My improvement may assume different forms—as, for instance, when applied to different types of breech-blocks. In the modified form (shown by Fig. 3) the plunger is formed with a wide annular groove 17, receiving a vertically-arranged plunger-stop in the form of a pin or screw 18, which is inserted after the extractor has been put in place. The groove is wide enough to permit the plunger all the play required for the operation of the extractor, but its forward end wall limits the rearward movement of the plunger, so that under gas-pressure it cannot be retired far enough to have its forward end disengaged from the extractor.

In view of the modification described and of other forms which may obviously be adopted I would have it understood that I do not limit myself to the exact construction set forth, but hold myself at liberty to make such variations therefrom as fairly fall within the spirit and scope of my invention.

Having fully described my invention, what I claim as new, and desire to secure by Letters Patent, is—

1. In a firearm, the combination with the breech-block thereof, of a swinging non-pivotal extractor, a spring-actuated plunger therefor, and a plunger-stop for limiting the movement of the plunger after the extractor is in place so as to prevent its disengagement from the extractor under gas-pressure.

2. In a firearm, the combination with the breech-block thereof, of a swinging non-pivotal extractor provided at its rear end with a foot having a retaining-hook, a spring-actuated plunger coacting with the said hook, and a plunger-stop arranged to be engaged by the rear end of the plunger when the extractor is in place to prevent the rearward movement of the plunger under gas-pressure to a sufficient degree to disengage the forward end of the plunger from the retaining-hook of the extractor.

In testimony whereof I have signed this specification in the presence of two subscribing witnesses.

THOMAS G. BENNETT.

Witnesses:
DANIEL H. VEADER,
H. S. LEONARD.